United States Patent
Yanagida et al.

(10) Patent No.: US 9,518,647 B2
(45) Date of Patent: Dec. 13, 2016

(54) LUBRICATING DEVICE OF AUTOMATIC TRANSMISSION

(75) Inventors: Tomoaki Yanagida, Susono (JP); Takaho Kawakami, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 195 days.

(21) Appl. No.: 14/232,996

(22) PCT Filed: Dec. 21, 2011

(86) PCT No.: PCT/JP2011/079733
§ 371 (c)(1),
(2), (4) Date: Jan. 15, 2014

(87) PCT Pub. No.: WO2013/094044
PCT Pub. Date: Jun. 27, 2013

(65) Prior Publication Data
US 2014/0166402 A1  Jun. 19, 2014

(51) Int. Cl.
*F16H 57/04* (2010.01)

(52) U.S. Cl.
CPC ...... *F16H 57/0473* (2013.01); *F16H 57/0479* (2013.01); *F16H 57/0484* (2013.01)

(58) Field of Classification Search
CPC .............................. F16H 57/0473; F16H 57/04
USPC ....................................................... 184/6.12
See application file for complete search history.

(56) References Cited

U.S. PATENT DOCUMENTS

| | | | |
|---|---|---|---|
| 8,522,923 B2 * | 9/2013 | Shimizu | F15B 11/05 184/6.12 |
| 2010/0095795 A1 * | 4/2010 | Kato | F16H 57/027 74/473.15 |
| 2010/0151993 A1 * | 6/2010 | Ike | F16H 57/02 477/138 |

FOREIGN PATENT DOCUMENTS

| | | | |
|---|---|---|---|
| JP | 2004-183716 A | | 7/2004 |
| JP | WO2008/072775 | * | 6/2008 |

* cited by examiner

*Primary Examiner* — William E Dondero
*Assistant Examiner* — Mark K Buse
(74) *Attorney, Agent, or Firm* — Andrews Kurth Kenyon LLP

(57) ABSTRACT

A lubricating device of an automatic transmission includes a partitioning member that partitions an oil chamber, to which a lubricating oil of a first oil chamber is introduced; a second oil chamber partitioned by the partitioning member and to which lubricating oil to supply to a forward clutch is introduced; and a third oil chamber partitioned by the partitioning member and to which lubricating oil to supply to a pinion unit such as a pinion gear coupled with one engagement unit of the forward clutch is introduced; wherein a clutch oil path that introduces the lubricating oil of the first oil chamber to the second oil chamber and a pinion oil path that introduces the lubricating oil of the first oil chamber to the third oil chamber are formed in a clutch drum interposed between the first oil chamber and the oil chamber.

5 Claims, 8 Drawing Sheets

LUBRICATING DEVICE OF AUTOMATIC TRANSMISSION

CROSS-REFERENCE TO RELATED APPLICATIONS

This is a national phase application based on the PCT International Patent Application No. PCT/JP2011/079733 filed on Dec. 21, 2011, the entire contents of which are incorporated herein by reference.

FIELD

The present invention relates to a lubricating device of an automatic transmission for supplying lubricating oil to a clutch, gear group, and the like in the interior of the transmission.

BACKGROUND

Conventionally, the lubricating device of the automatic transmission in which a lubricating oil is supplied from an oil pump through an oil path in the interior of an input shaft, and such lubricating oil is fed to a lubricating target through an oil path and an oil chamber of each member by a centrifugal force is known. For example, the lubricating device disclosed in Patent Literature 1 includes an oil path and an oil chamber for supplying the lubricating oil to respective engagement unit of a forward clutch, a pinion gear of a planetary gear device for rotating one engagement unit of the forward clutch and one engagement unit of a reverse brake with the input shaft as a center. A partitioning member for allocating the supplied lubricating oil to the respective engagement unit side of the forward clutch and the pinion gear side of the planetary gear device is arranged in the oil chamber. That is, the oil chamber is partitioned by the partitioning member to a space on the pinion gear side and a space on the forward clutch side. In the lubricating device, an oil path for introducing the lubricating oil to the space on the pinion gear side is formed in a member on a radially inner side of the partitioning member. Therefore, the lubricating oil introduced from the oil path to the oil chamber is first fed to the pinion gear side, and the excess is further moved toward the radially outer side. The excess lubricating oil is discharged to the space on the forward clutch side through a through-hole formed in the partitioning member, and then fed to the engagement unit.

CITATION LIST

Patent Literature

Patent Literature 1: Japanese Patent Application Laid-open No. 2004-183716

SUMMARY

Technical Problem

For example, if the vehicle repeats stop and start in traffic congestion, and the like, the engagement operation and the release operation of the forward clutch are repeated. In a vehicle that can perform inertia traveling, the forward clutch is released with the stop of the power source during the inertia traveling and the forward clutch is engaged with the restart of the power source, and thus the engagement operation and the release operation of the forward clutch are sometimes repeated during the inertia traveling. In the lubricating device of Patent Literature 1, the lubricating oil discharged from the space on the pinion gear side through the through-hole of the partitioning member becomes the majority of the lubricating oil supplied to the respective engagement unit of the forward clutch. Therefore, if the engagement operation and the release operation of the forward clutch are repeated, the supply amount of the lubricating oil to the forward clutch may become insufficient and the lubricating performance and the cooling performance in each engagement unit may lower.

In view of improving the drawbacks of the related art, it is an object of the present invention to provide a lubricating device of an automatic transmission capable of enhancing the durability of the forward clutch.

Solution to Problem

In order to achieve the above mentioned object, a lubricating device of an automatic transmission according to the present invention includes a first oil chamber, to which a lubricating oil is introduced; a partitioning member configured to partition a space, to which the lubricating oil of the first oil chamber is introduced; a second oil chamber partitioned by the partitioning member and to which a lubricating oil to supply to a forward clutch is introduced; and a third oil chamber partitioned by the partitioning member and to which a lubricating oil to supply to a pinion unit coupled with one engagement unit of the forward clutch is introduced, wherein a clutch oil path that introduces the lubricating oil of the first oil chamber to the second oil chamber and a pinion oil path that introduces the lubricating oil of the first oil chamber to the third oil chamber are formed in a member interposed between the first oil chamber and the space in which the partitioning member is arranged, and an oil path switching member that opens the clutch oil path and interrupts the pinion oil path at time of engagement of the forward clutch, and that interrupts the clutch oil path and opens the pinion oil path at time of release of the forward clutch is arranged.

Here, it is desirable that the oil path switching member performs oil path switching at the time of engagement of the forward clutch with a hydraulic pressure for clutch engagement of the forward clutch.

Further, it is desirable that the automatic transmission is mounted on a vehicle that performs inertia traveling during traveling.

Advantageous Effects of Invention

A lubricating device of an automatic transmission according to the present invention can supply a greater amount of lubricating oil to the forward clutch than to the pinion unit at the time of clutch engagement of the forward clutch, and can supply a greater amount of lubricating oil to the pinion unit than to the forward clutch at the time of clutch release of the forward clutch. Therefore, according to the lubricating device, the lubricating oil is preferentially supplied to the forward clutch than to the pinion unit if the forward clutch requires the supply of the lubricating oil, and thus the durability of the forward clutch can be enhanced.

DESCRIPTION OF EMBODIMENTS

Figure 1:
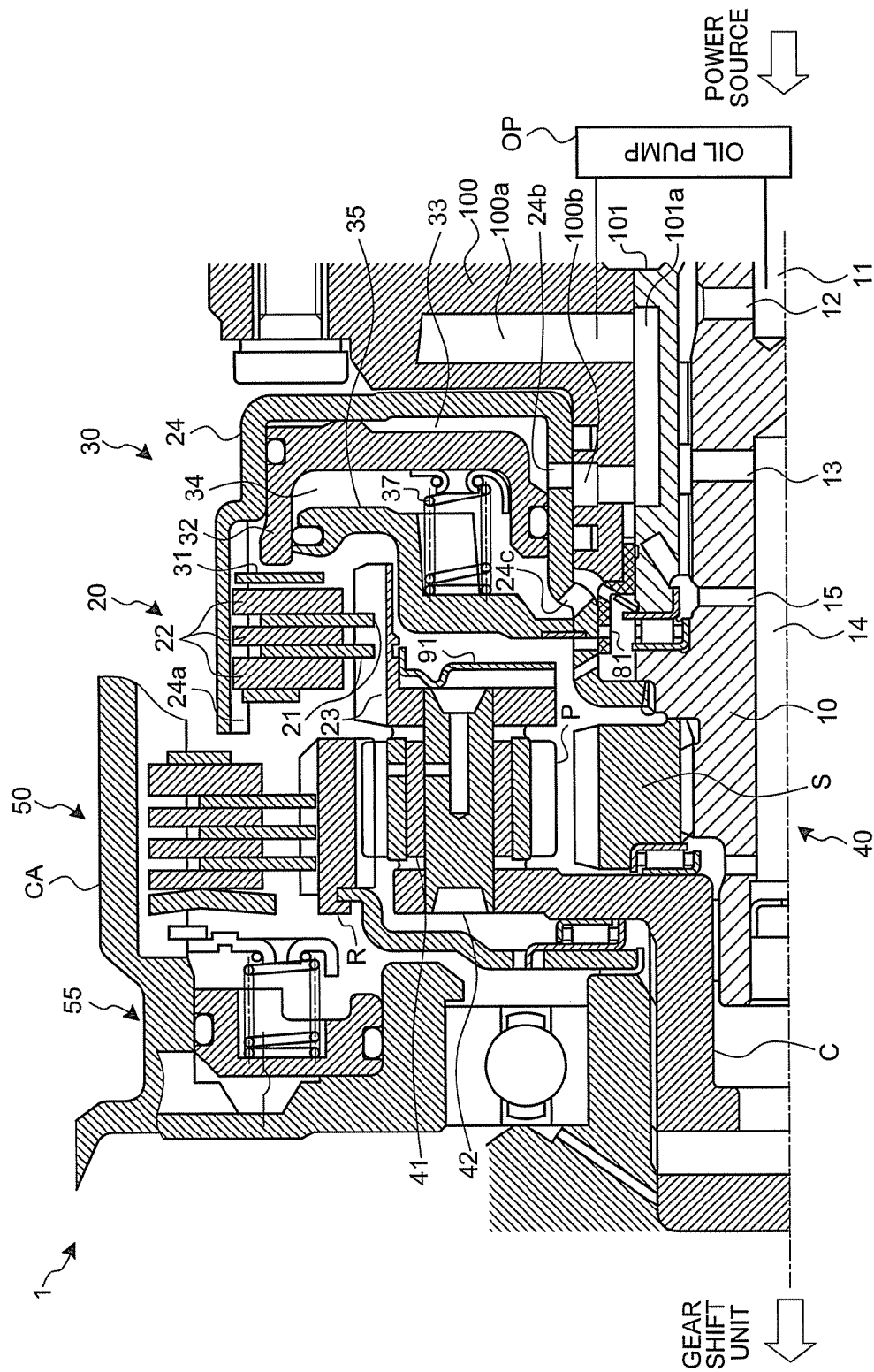
FIG. 1 is a view illustrating one example of an automatic transmission applied with a lubricating device according to the present invention.

An embodiment of a lubricating device of an automatic transmission according to the present invention will be hereinafter described in detail based on the drawings. It should be noted that the present invention is not limited by such embodiment.

[Embodiment]

An embodiment of a lubricating device of an automatic transmission according to the present invention will be described based on FIG. 1 to FIG. 8.

First, the automatic transmission applied with the lubricating device according to the present invention will be briefly described.

The automatic transmission, which becomes an application target of the lubricating device, has at least a forward clutch arranged between a power source and a gear shift unit of the vehicle. For example, a general automatic stepped transmission including a gear shift unit with a plurality of gear shift positions and a gear shifting brake (clutch), and the like; a belt type automatic continuous variable transmission including a gear shift unit with primary and secondary pulleys, belt, and the like correspond to the relevant automatic transmission. Reference sign 1 in FIG. 1 indicates the automatic transmission exemplified herein. The lubricating device supplies the lubricating oil of the entire automatic transmission 1, but the supply of lubricating oil to the forward clutch will be focused herein. Therefore, in FIG. 1, the configuration of the portion where the forward clutch, and the like are arranged, that is, between the power source and the gear shift unit is illustrated.

The automatic transmission 1 includes an input shaft 10, which is coupled to an output shaft of the power source, a forward clutch 20, and a clutch control device 30, which operates the forward clutch 20. Hereinafter, unless particularly stated, a direction along the input shaft 10 is referred to as an axis line direction, and a direction about the input shaft 10 is referred to as a circumferential direction. A direction orthogonal to the input shaft 10 is referred to as a radial direction, where a side toward the inner side is referred to as a radially inner side and a side toward the outer side is referred to as a radially outer side. Furthermore, when referring to an annular shape, this refers to a mode of a ring having a rotation center axis of the input shaft 10 as a center unless particularly stated.

The forward clutch 20 is a power disconnecting/connecting device such as a so-called friction clutch, and includes first and second engagement units 21, 22. The first and second engagement units 21, 22 are annular engagement members that can relatively rotate with the input shaft 10 as the center with respect to each other. Here, the first and second engagement units 21, 22 are respectively prepared in plurals, and are alternately arranged in the axis line direction. The forward clutch 20 performs power transmission between the engagement units by pushing (engaging) the respective annular surfaces of the first engagement unit 21 and the second engagement unit 22, and disconnects the power transmission between the engagement units by separating (releasing) the respective annular surfaces.

Figure 2:
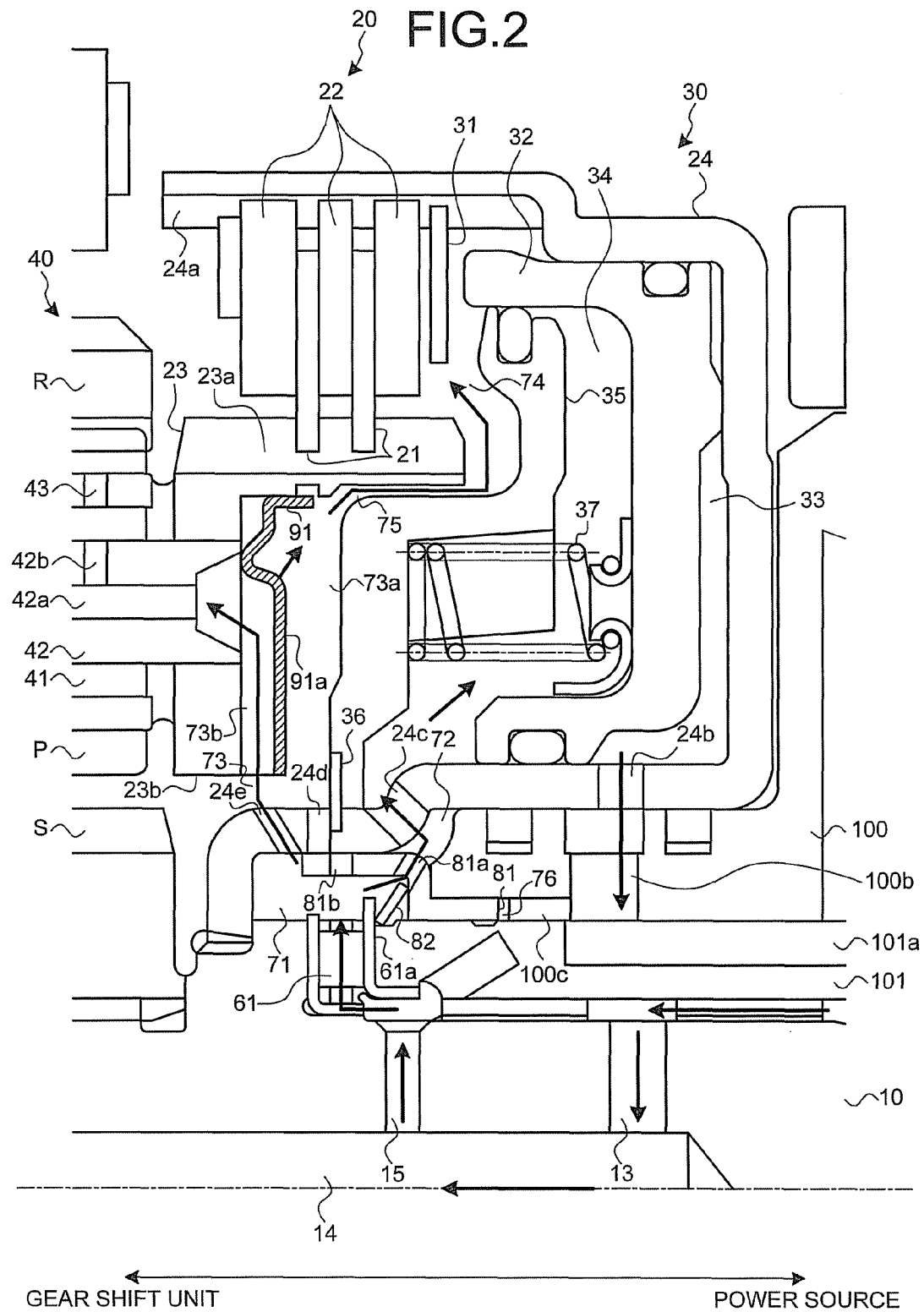
FIG. 2 is a view illustrating a state at a time of clutch release of the lubricating device according to an embodiment.

The first engagement unit 21 arranged closer to the radially inner side has the radially inner side portion held by a tubular holding member 23, which rotation axis is aligned with the input shaft 10. The holding member 23 is held by a plurality of pinion shafts 42 of a differential device 40, to be described later. The holding member 23 includes a tube portion 23a for holding the first engagement unit 21, and an annular portion 23b extended toward the radially inner side from an end on the gear shift unit side of the tube portion 23a and attached to one end on the power source side of each pinion shaft 42 (FIG. 2). Thus, the first engagement unit 21 is arranged on the radially outer side than each pinion shaft 42. The holding member 23 is held by each pinion shaft 42, similar to a carrier C of the differential device 40. Therefore, the first engagement unit 21 can rotate in the circumferential direction integrally with the holding member 23 and the carrier C.

The second engagement unit 22 arranged closer to the radially outer side has a radially outer side portion held by a holding portion 24a on a radially outer side of a clutch drum 24. The clutch drum 24 is an annular body, and is molded such that the cross-section of the radially outer side portion taken in the radial direction is a U-shaped. The clutch drum 24 has the U-shaped opening directed toward the gear shift unit, and the forward clutch 20 and the clutch control device 30 are accommodated in the annular space composed of the U-shaped portion. The holding portion 24a is formed on an inner circumferential surface of the radially outer side portion forming such space. The clutch drum 24 is coupled to the input shaft 10 at an end on the U-shaped radially inner side portion, and can rotate in the circumferential direction integrally with the input shaft 10. Therefore, the second engagement unit 22 can rotate in the circumferential direction integrally with the clutch drum 24 and the input shaft 10.

In the exemplification, a gap is provided between the inner circumferential surface of the U-shaped radially inner side portion and the respective outer circumferential surfaces of the input shaft 10 and a stator sleeve 101, to be described later, where an oil pump cover 100 is interposed between the U-shaped radially inner side portion and the stator sleeve 101. The gap between the radially inner side portion and the input shaft 10 forms oil chambers 71, 72, to be described later.

The clutch control device 30 is an actuator for engaging or releasing the first engagement unit 21 and the second engagement unit 22. The engagement and release are performed herein using the hydraulic pressure of the working oil (lubricating oil is used herein) fed from the oil pump OP and the elastic force of an elastic member 37.

The clutch control device 30 includes an annular pushing member 31 for pushing the second engagement unit 22 on the outer side closer to the power force against the first engagement unit 21 using its deflection, and a piston 32 for applying a pushing force on the pushing member 31. The pushing member 31 has a radially outer side portion held by the holding portion 24a, and pushes the second engagement unit 22 against the first engagement unit 21 with the deflection of the annular surface on the radially inner side of the holding portion 24a. The piston 32 is an annular body, and is formed such that the cross-section of the radially outer side portion taken in the radial direction is a U-shaped. The piston 32 has the U-shaped opening directed toward the gear shift unit side, similar to the clutch drum 24, and is accommodated in the annular space composed of the U-shaped portion of the clutch drum 24 in such state. The piston 32 is arranged on the power source side than the pushing member 31. The piston 32 can relatively move in the axis line direction with respect to the clutch drum 24, and applies the pushing force in the axis line direction on the pushing member 31 at the end of the U-shaped radially outer side portion when moved toward the pushing member 31.

The clutch control device 30 includes an engagement oil chamber 33 for moving the piston 32 toward the pushing member 31 side. The engagement oil chamber 33 is an annular space formed between the piston 32 and the clutch drum 24. The clutch drum 24 does not move in the axis line direction with respect to the input shaft 10, and hence the piston 32 can move toward the pushing member 31 by the rise in hydraulic pressure of the engagement oil chamber 33. The hydraulic pressure applied on the annular surface of the piston 32 in this case is a magnitude at which the piston 32 can be moved against the elastic force of the elastic member 37, to be described later, and the pushing force by the hydraulic pressure of a canceller oil chamber 34, to be described later. In such clutch control device 30, the result of subtracting the elastic force of the elastic member 37 and the pushing force by the hydraulic pressure of the canceller oil chamber 34, to be described later, from the pushing force by the hydraulic pressure of the engagement oil chamber 33 becomes the pushing force (i.e., clutch engagement pressure) in the axis line direction for moving the piston 32 toward the pushing member 31 side. A centrifugal hydraulic pressure involved in the rotation in the circumferential direction by the lubricating oil of the engagement oil chamber 33 acts on the piston 32 in the axis line direction the same as at the time of clutch engagement, and the cancel hydraulic pressure in the axis line direction for cancelling such centrifugal hydraulic pressure also acts thereon from the canceller oil chamber 34. Thus, it is desirable to take into consideration the centrifugal hydraulic pressure and the cancel hydraulic pressure when considering the hydraulic pressure and the clutch engagement pressure to applied on the annular surface of the piston 32.

The lubricating oil is introduced to the engagement oil chamber 33 through a first engagement oil path 100a, a second engagement oil path 101a, a third engagement oil path 100b, and a fourth engagement oil path 24b. The first engagement oil path 100a and the third engagement oil path 100b are formed inside the oil pump cover 100. The lubricating oil of the oil pump OP is introduced to the first engagement oil path 100a. The second engagement oil path 101a is formed by the groove portion in the axis line direction on the outer circumferential surface of the stator sleeve 101 and the inner circumferential surface of the oil pump cover 100. The second engagement oil path 101a communicates the first engagement oil path 100a and the third engagement oil path 100b. The fourth engagement oil path 24b is a through-hole connecting the inner peripheral surface side and the outer peripheral surface side at the U-shaped radially inner side portion in the clutch drum 24, and communicates the engagement oil chamber 33 and the third engagement oil path 100b. The exemplified automatic transmission 1 includes the torque converter between the automatic transmission and the power source, and the power source side of the input shaft 10 is inserted into the stator sleeve 101, so that the second engagement oil path 101a is formed on the outer circumferential surface of the stator sleeve 101.

The clutch control device 30 includes the canceller oil chamber 34 for generating the cancel hydraulic pressure described above. The canceller oil chamber 34 is formed on the opposite side in the axis line direction from the engagement oil chamber 33 with the piston 32 in between. The clutch control device 30 includes an annular body 35 that covers the inner peripheral surface of the U-shaped radially outer side portion in the piston 32 with the radially outer side portion and that covers the outer peripheral surface of the U-shaped radially inner side portion in the clutch drum 24 with the radially inner side portion to form the canceller oil chamber 34. The annular body 35 closes the opening of the annular space of the piston 32, and forms the canceller oil chamber 34 by closing the opening. The annular body 35 is prohibited from relatively moving in the axis line direction with respect to the clutch drum 24 by an annular locking member (snap ring, etc.) 36 illustrated in FIG. 2. The canceller oil chamber 34 is introduced with the lubricating oil from a first clutch release oil path 24c of the clutch drum 24, and generates the cancel hydraulic pressure by the hydraulic pressure of the lubricating oil. The canceller oil chamber 34 is also introduced with the lubricating oil from the first clutch release oil path 24c at the time of clutch release control of the forward clutch 20, and generates the hydraulic pressure for separating the piston 32 from the pushing member 31. The lubricating oil of the oil chamber 71, to be described later, is introduced to the first clutch release oil path 24c through a second clutch release oil path 81a and the oil chamber 72.

The canceller oil chamber 34 includes the elastic member 37 having one end held on the annular surface side of the piston 32 and the other end held on the annular surface side of the annular body 35. The exemplified elastic member 37 generates the elastic force in the direction of separating the piston 32 from the annular body 35 in the axis line direction. In the clutch control device 30, the result of subtracting the pushing force by the hydraulic pressure of the engagement oil chamber 33 from the elastic force and the pushing force by the hydraulic pressure of the canceller oil chamber 34 becomes the pushing force (i.e., clutch release pressure) in the direction in the axis line direction of separating the piston 32 from the pushing member 31. A helical spring is used for the elastic member 37 herein. Therefore, a plurality of elastic members 37 is arranged at substantially equal interval in the circumferential direction in the canceller oil chamber 34.

In the clutch control device 30, the lubricating pressure fed by the oil pump OP is supplied from the fourth engagement oil path 24b to the engagement oil chamber 33 when engaging the forward clutch 20. Thus, the clutch engagement pressure in the axis line direction is applied on the piston 32 and the piston 32 moves toward the pushing member 31, so that the forward clutch 20 becomes the engaged state with the engagement operation. In this case, in the canceller oil chamber 34, the supply of lubricating oil from the first clutch release oil path 24c is attempted to be carried out by the pressure feeding force of the oil pump OP and the centrifugal force, but a force against such forces is applied by the movement of the piston 32 and the lubricating oil is discharged from the first clutch release oil path 24c. On the other hand, when releasing the forward clutch 20, the lubricating oil is supplied from the first clutch release oil path 24c to the canceller oil chamber 34 and the lubricating oil is discharged from the engagement oil chamber 33 through the fourth engagement oil path 24b. Thus, the clutch release pressure in the axis line direction is applied on the piston 32 and the piston 32 is separated from the pushing member 31, whereby the forward clutch 20 becomes the released state with the release operation.

Furthermore, the automatic transmission 1 includes the differential device 40 on the gear shift unit side than the forward clutch 20 and the clutch control device 30. The differential device 40 transmits the power of the power source to the gear shift unit. The exemplified differential device 40 is a so-called planetary gear device including the sun gear S, the ring gear R, a plurality of pinion gears P, and the carrier C that can differentially rotate with each other.

The sun gear S rotates integrally with the input shaft 10. The pinion gear P is held by the pinion shaft 42 through a bearing (e.g., roller bearing) 41, and can relatively rotate with respect to the pinion shaft 42. The respective pinion shaft 42 couples the holding member 23 to one end on the power source side and couples the carrier C to the other end on the gear shift unit side. The carrier C is coupled to the input side of the gear shift unit, and transmits the power of the power source to the gear shift unit. For example, the input shaft of the gear shift unit is coupled in the case of the automatic stepped transmission previously described, and the primary pulley is coupled in the case of the belt type automatic continuous variable transmission is coupled to the carrier C.

A reverse brake 50 is also prepared in the automatic transmission 1. The reverse brake 50 includes a first engagement unit held on the outer circumferential surface of the ring gear R and a second engagement unit held on the inner peripheral surface of a housing CA of the automatic transmission 1. The reverse brake 50 performs the engagement operation or the release operation with a hydraulic actuator 55, similar to the forward clutch 20.

In the automatic transmission 1, the forward clutch 20 is performed engagement control and the reverse brake 50 is performed release control at the time of forward movement of the vehicle, where the power of the power source transmitted to the input shaft 10 is transmitted to the gear shift unit through the clutch drum 24, the forward clutch 20, and the carrier C. At the time of backward movement of the vehicle, on the other hand, the forward clutch 20 is performed release control and the reverse brake 50 is performed engagement control, where the power of the power source transmitted to the input shaft 10 is transmitted to the carrier C in the opposite direction from the time of forward movement of the vehicle through the sun gear S, and transmitted to the gear shift unit.

Next, the lubricating device of the automatic transmission 1 configured as above will be described. The lubricating device supplies the lubricating oil introduced to a first oil path 11 of the input shaft 10 with the oil pump OP to each unit in the automatic transmission 1, and feeds the lubricating oil with the pressure feeding force of the oil pump OP and the centrifugal force involved in the rotation of various types of rotating bodies of the automatic transmission 1.

As illustrated in FIG. 1, the first oil path 11 is an oil path in the axis line direction formed inside the input shaft 10. The lubricating oil of the first oil path 11 is discharged to the outside of the input shaft 10 through a second oil path 12 in the radial direction, and is introduced from a third oil path 13 in the radial direction of the input shaft 10 to a fourth oil path 14 through the gap between the outer circumferential surface of the input shaft 10 and the inner circumferential surface of the stator sleeve 101, similar to FIG. 2. The fourth oil path 14 is an oil path in the axis line direction formed inside the input shaft 10, and is also responsible for the supply of lubricating oil to the gear shift unit.

As illustrated in FIG. 2, the lubricating oil of the fourth oil path 14 is discharged to the outside of the input shaft 10 through a fifth oil path 15 in the radial direction, and transmitted to the annular oil chamber (first oil chamber) 71 through the interior of a thrust bearing 61 arranged between the input shaft 10 and the end of the stator sleeve 101. Thus, the thrust bearing 61 is lubricated by the flow of lubricating oil. The oil chamber 71 is an annular space surrounded by the input shaft 10, the stator sleeve 101, the thrust bearing 61, the U-shaped radially inner side portion in the clutch drum 24, and an oil path switching member 81.

The oil path switching member 81 divides the annular space surrounded by the input shaft 10, the stator sleeve 101, the thrust bearing 61, the U-shaped radially inner side portion in the clutch drum 24, and the oil pump cover 100 to the oil chamber 71 and the oil chamber 72. The oil path switching member 81 is formed such that the diameter is small on the power source side than the gear shift unit side. The oil path switching member 81 is arranged with the power source side sandwiched by the inner circumferential surface of the oil pump cover 100 and the outer circumferential surface of the stator sleeve 101, and with the outer peripheral surface on the gear shift unit side brought into contact with the inner peripheral surface of the radially inner side portion of the clutch drum 24.

Figure 3:
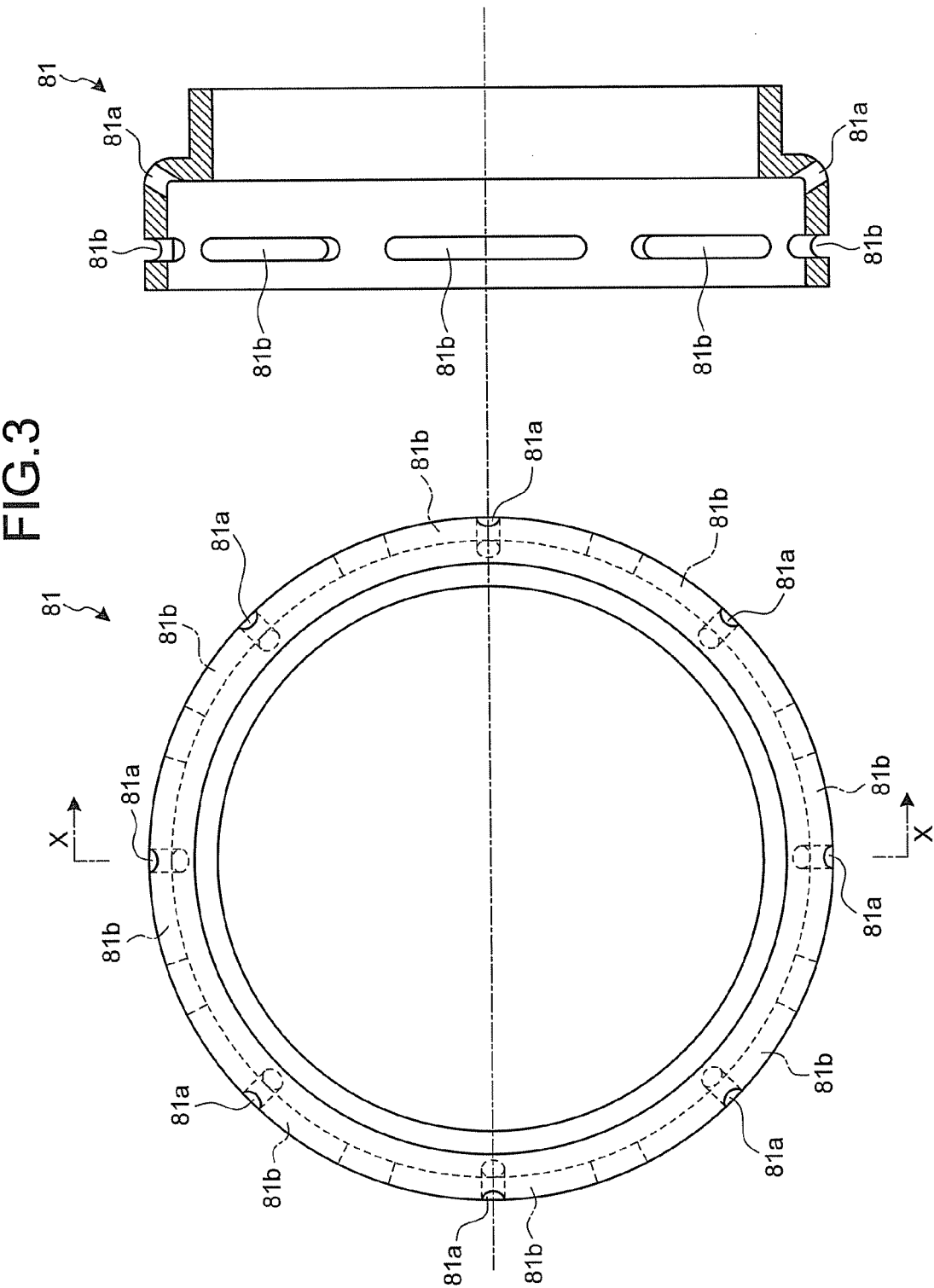
FIG. 3 is a view illustrating a state at the time of clutch release of the lubricating device according to the embodiment.

The oil chamber 72 is an annular space surrounded by the radially inner side portion in the clutch drum 24, the oil pump cover 100, and the oil path switching member 81. The oil chamber 72 is connected to the first clutch release oil path 24c described above, and is communicated to the canceller oil chamber 34 through the first clutch release oil path 24c. In the exemplification, the lubricating oil of the oil chamber 72 is supplied to the canceller oil chamber 34 when releasing the forward clutch 20. The lubricating oil of the oil chamber 72 uses the lubricating oil supplied from the oil chamber 71. Therefore, as illustrated in FIG. 2 and FIG. 3, the oil path switching member 81 is formed with the oil path (hereinafter referred to as "second clutch release oil path") 81a for communicating the oil chamber 71 and the oil chamber 72. The second clutch release oil path 81a is formed at the boundary portion of the power source side and the gear shift unit side in the oil path switching member 81, so that the communication state of the oil chamber 71 and the oil chamber 72 is maintained even if the oil path switching member 81 is moved as will be described below. The second clutch release oil path 81a is desirably formed in plurals. In the exemplification, the second clutch release oil path 81a is radially formed at substantially equal interval with the axis line as the center, as illustrated in FIG. 3.

The lubricating device supplies the lubricating oil to the forward clutch 20 and the pinion unit (pinion gear P, bearing 41, pinion shaft 42) of the differential device 40. The lubricating oil is supplied to the forward clutch 20, and the like through an annular oil chamber 73. The oil chamber 73 is an annular space surrounded by the holding member 23 of the first engagement unit 21, the annular body 35 forming the canceller oil chamber 34, and the U-shaped radially inner side portion in the clutch drum 24. The lubricating oil of the oil chamber 71 described above is supplied to the oil chamber 73.

First, the first engagement unit 21 and the second engagement unit 22 of the forward clutch 20 are arranged in an annular oil chamber 74 between the holding portion 24a of the clutch drum 24 and the tube portion 23a of the holding member 23, and are supplied with the lubricating oil of the oil chamber 74. The oil chamber 74 is connected to the oil chamber 73 through the annular oil path 75 between the tube portion 23a and the annular body 35. Therefore, the lubricating oil of the oil chamber 73 is supplied to the first engagement unit 21 and the second engagement unit 22 through the oil path 75.

The lubricating oil of an oil path 42a in the axis line direction of the pinion shaft 42 is supplied to the pinion unit of the differential device 40. The oil path 42a is connected to the oil chamber 73, so that the lubricating oil is introduced from the oil chamber 73. The lubricating oil of the oil path 42a is discharged to the outside of the pinion shaft 42 through an oil path 42b in the radial direction, and supplied to the outer circumferential surface of the pinion shaft 42, the bearing 41, and the inner circumferential surface of the pinion gear P. The pinion gear P is formed with an oil path 43 in the radial direction for communicating the inner circumferential surface side and the tooth plane side, where the lubricating oil supplied to the inner circumferential surface and the bearing 41 is supplied to the tooth plane of the pinion gear P through the oil path 43.

An annular partitioning member 91 is arranged in the oil chamber 73. The partitioning member 91 has the radially outer side portion attached to the inner circumferential surface of the tube portion 23a of the holding member 23 with a gap formed between the radially inner side portion and the U-shaped radially inner side portion in the clutch drum 24, thus partitioning the oil chamber 73 into an oil chamber (second oil chamber) 73a on the forward clutch 20 side and the oil chamber (third oil chamber) 73b on the pinion unit side. The oil chamber 73a on the forward clutch 20 side is the oil chamber to which the lubricating oil for lubricating the forward clutch 20 is introduced, and is connected to the oil path 75 described above. The oil chamber 73b on the pinion unit side, on the other hand, is the oil chamber to which the lubricating oil for lubricating the pinion unit is introduced, and is connected to the oil path 42a of the pinion shaft 42. The oil chamber 73a is hereinafter referred to as a clutch lubricating oil chamber 73a, and the oil chamber 73b is hereinafter referred to as a pinion lubricating oil chamber 73b.

Figure 4:
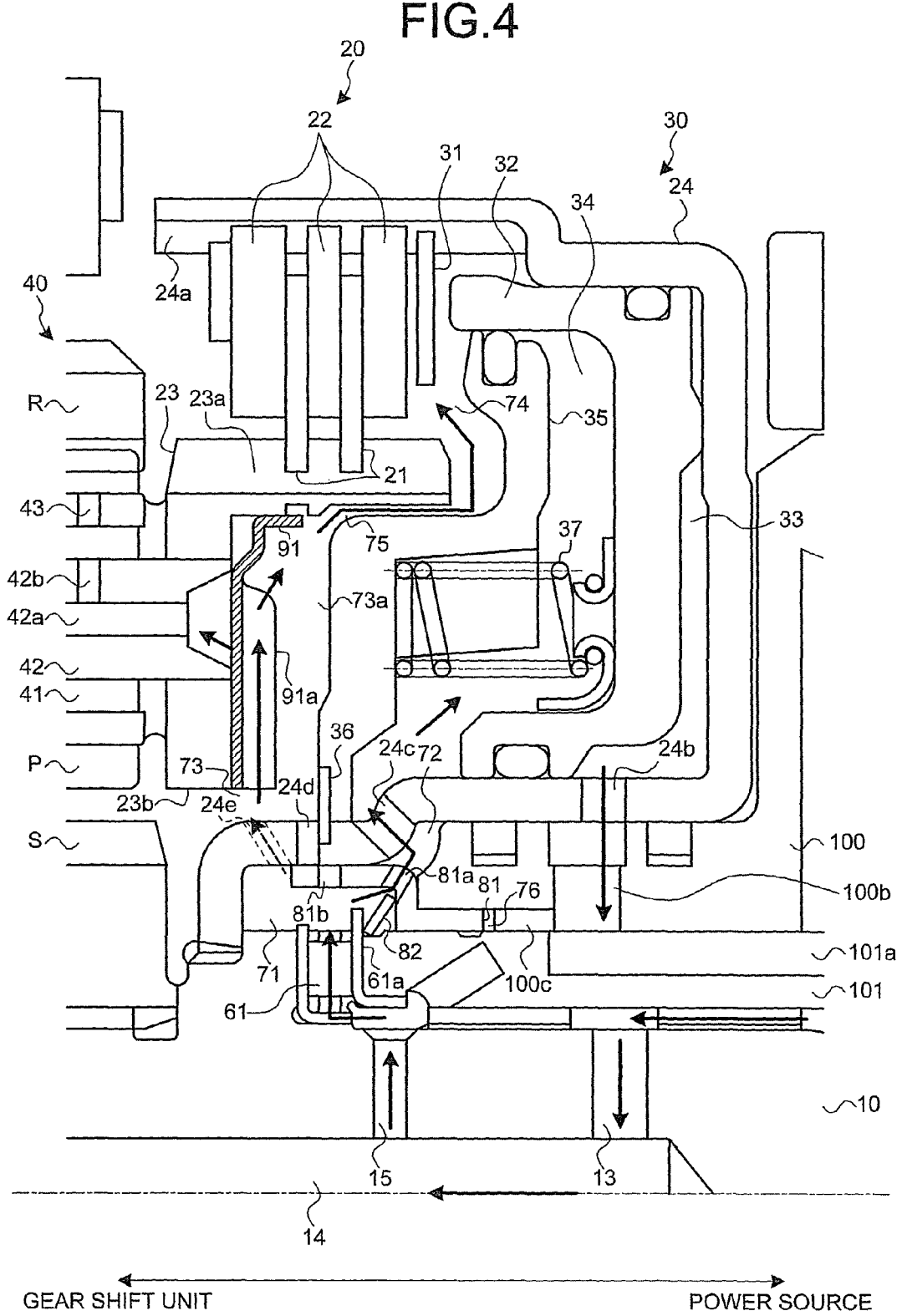
FIG. 4 is a view describing an oil path switching member, where a left side in the plane of drawing is a view seen from an axis line direction and a right side in the plane of drawing is a cross-sectional view taken along line X-X in the figure of the left side in the plane of drawing.

The partitioning member 91 includes an annular plate portion to be brought into contact with or brought proximate to the annular portion 23b of the holding member 23 in the oil chamber 73, for example. In the oil chamber 73, the annular clutch lubricating oil chamber 73a is formed on the clutch control device 30 side than the plate portion. Furthermore, in the partitioning member 91, from the end face portion of the pinion shaft 42 to the radially inner side portion in the plate portion is bulged out (FIGS. 2, 4). The space on the annular portion 23b side formed by a evaginating portion 91a becomes the pinion lubricating oil chamber 73b, and is arranged for every pinion shaft 42. Thus, when seen in the axis line direction, the partitioning member 91 has the evaginating portion 91a radially formed at substantially equal interval. In another view, the partitioning member 91 includes a recess radially formed at substantially equal interval. The recess exists between the evaginating portions 91a, and configures one portion of the clutch lubricating oil chamber 73a. That is, the clutch lubricating oil chamber 73a is configured by each recess and the annular portion described above. In FIGS. 2 and 4, only the partitioning member 91 is hatched for the sake of convenience.

An oil path (hereinafter referred to as "clutch oil path") 24d for introducing the lubricating oil of the oil chamber 71 to the clutch lubricating oil chamber 73a is formed at the U-shaped radially inner side portion in the clutch drum 24. The clutch oil path 24d is a through-hole for communicating the oil chamber 71 and the oil chamber 73, to which the lubricating oil of the oil chamber 71 is introduced, and the lubricating oil of the oil chamber 71 is introduced to the clutch lubricating oil chamber 73a by directing the axis line direction of the through-hole toward the clutch lubricating oil chamber 73a. For example, the axis line direction of the through-hole and the clutch lubricating oil chamber 73a are intersected herein. In the exemplification, the lubricating oil of the clutch oil path 24d is introduced to the annular portion in the clutch lubricating oil chamber 73a.

Furthermore, an oil path (hereinafter referred to as "pinion oil path") 24e for introducing the lubricating oil of the oil chamber 71 to the pinion lubricating oil chamber 73b is formed at the radially inner side portion of the clutch drum 24. The pinion oil path 24e is a through-hole for communicating the oil chamber 71 and the oil chamber 73, and the lubricating oil of the oil chamber 71 is introduced to the pinion lubricating oil chamber 73b by directing the axis line direction of the through-hole toward the pinion lubricating oil chamber 73b. For example, the axis line direction of the through-hole and the pinion lubricating oil chamber 73b are intersected herein. In the exemplification, the pinion oil path 24e is arranged for every pinion lubricating oil chamber 73b.

As illustrated in FIG. 2, the clutch oil path 24d and the pinion oil path 24e are formed at positions offset in the axis line direction in the clutch drum 24. The clutch oil path 24d and the pinion oil path 24e are preferably formed shifted with respect to each other for the circumferential positions as well to ensure the durability of the U-shaped radially inner side portion in the clutch drum 24.

The partitioning member 91 is arranged so that the lubricating oil is supplied to the pinion unit at the time of backward movement of the vehicle and at the time of traction in which the forward clutch 20 is released. Thus, a great amount of lubricating oil needs to be fed toward the pinion unit at the time of clutch release of the forward clutch 20. On the contrary, at the time of clutch engagement of the forward clutch 20, the supply of lubricating oil to the forward clutch 20 becomes more important than to the pinion unit. Therefore, in the lubricating device, the clutch oil path 24d is closed and the lubricating oil of the oil chamber 71 is introduced from the pinion oil path 24e to the oil chamber 73 at the time of clutch release, and the pinion oil path 24e is closed and the lubricating oil of the oil chamber 71 is introduced from the clutch oil path 24d to the oil chamber 73 at the time of clutch engagement. Most of the lubricating oil introduced through the pinion oil path 24e is introduced to the pinion lubricating oil chamber 73b (FIG. 2), and one part is introduced to the clutch lubricating oil chamber 73a (FIG. 4).

The oil path switching corresponding to the state of the forward clutch 20 is carried out by moving the oil path switching member 81 in the axis line direction. An oil path 81b for communicating the inner circumferential surface side and the outer circumferential surface side is formed on the gear shift unit side of the oil path switching member 81.

In the exemplification, as illustrated in FIG. 2, the oil chamber 71 and the oil chamber 73 in the clutch oil path 24d are interrupted by covering the clutch oil path 24d from the oil chamber 71 side on the gear shift unit side of the oil path switching member 81 at the time of clutch release. The oil chamber 71 and the oil chamber 73 are communicated with the pinion oil path 24e by interrupting the clutch oil path 24d with the end on the gear shift unit side. In this case, the oil path 81b on the power source side than the end on the gear shift unit side is blocked with the U-shaped radially inner side portion in the clutch drum 24. As described above, the lubricating oil of the oil chamber 71 is fed to the oil chamber 72 through the second clutch release oil path 81a and the lubricating oil of the oil chamber 72 is fed to the canceller oil chamber 34 through the first clutch release oil path 24c at the time of clutch release. Thus, the lubricating oil of the oil chamber 71 is also fed to the oil chamber 73 through the pinion oil path 24e with the centrifugal force at the time of clutch release. The pinion oil path 24e introduces the lubricating oil to the pinion lubricating oil chamber 73b, similar to the description made above. Therefore, the lubricating oil is preferentially supplied toward the pinion unit at the time of clutch release.

Figure 5:
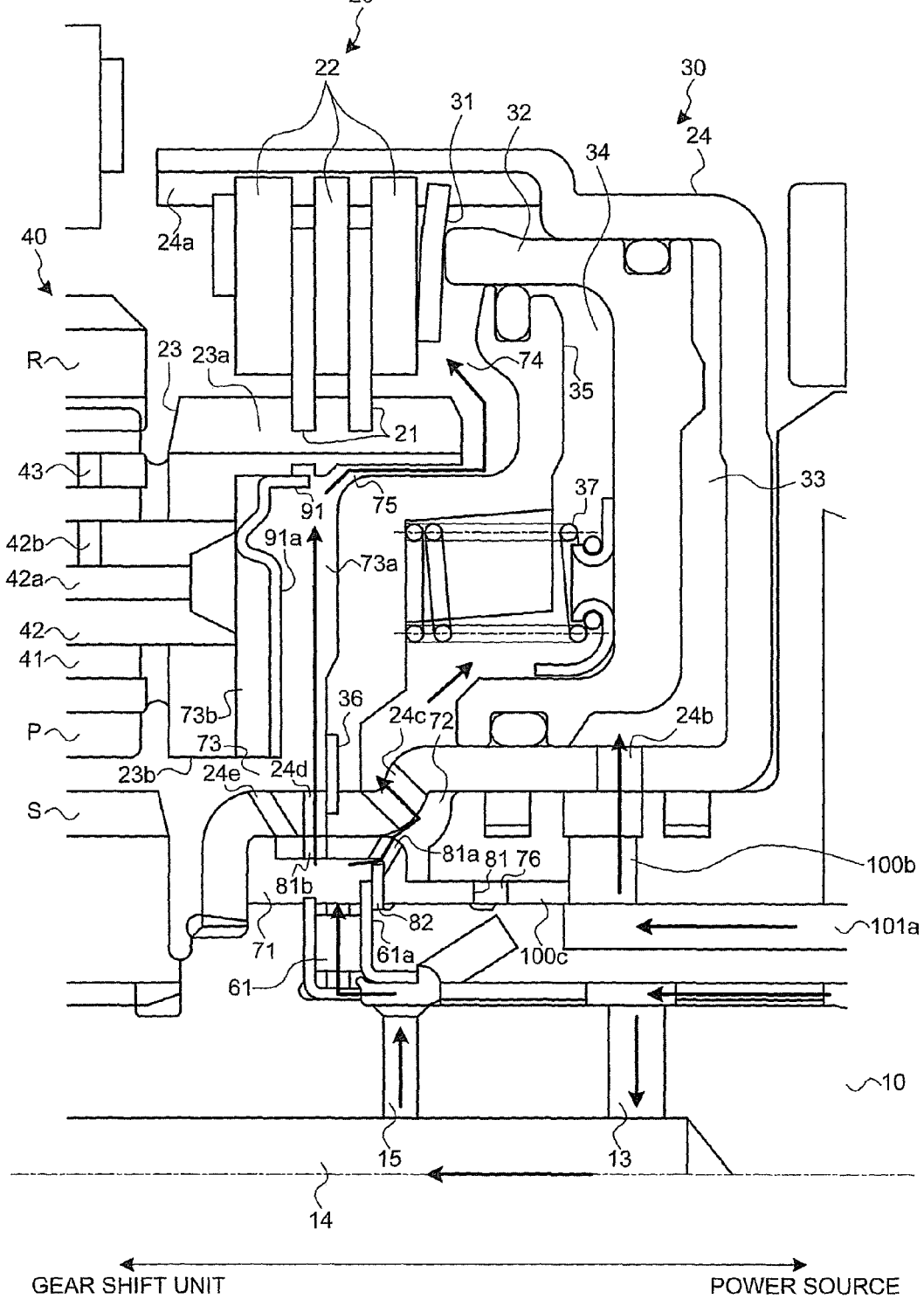
FIG. 5 is a view illustrating a state at a time of clutch engagement of the lubricating device according to the embodiment.

At the time of clutch engagement, as illustrated in FIG. 5, the oil path switching member 81 is moved toward the gear shift unit side than at the time of clutch release, and the pinion oil path 24e is covered from the oil chamber 71 side with the end on the gear shift unit side of the oil path switching member 81 and the oil path 81b of the oil path switching member 81 is communicated to the clutch oil path 24d. The oil chamber 71 and the oil chamber 73 are thus communicated with the oil path 81b and the clutch oil path 24d. Therefore, at the time of clutch engagement, the lubricating oil of the oil chamber 71 is preferentially supplied to the clutch lubricating oil chamber 73a through the oil path 81b and the clutch oil path 24d by the pressure feeding force of the oil pump OP and the centrifugal force.

As illustrated in FIG. 4, the oil path 81b is formed to a long hole in which the circumferential direction becomes the longitudinal direction, and is desirably arranged in plurals in the circumferential direction. This is because the oil path 81b can ensure the flow rate of the lubricating oil with respect to the clutch oil path 24d or the pinion oil path 24e of the clutch drum 24 regardless of the respective phases in the circumferential direction of the clutch drum 24 and the oil path switching member 81 at the time of clutch engagement or at the time of clutch release of the forward clutch 20 by forming the plurality of oil paths 81b as long holes.

The hydraulic pressure at the time of clutch engagement is used for the movement of the oil path switching member 81. Specifically, a gap is formed between the annular end face on the power source side of the oil path switching member 81 and the oil pump cover 100 to form an annular space in between. With such space as an oil chamber 76, the working oil is introduced to the oil chamber 76, so that the oil path switching member 81 moves toward the gear shift unit side with the hydraulic pressure applied on the annular end face on the power source side. The oil chamber 76 is communicated to the third engagement oil path 100b through an oil path 100c of the oil pump cover 100. The oil path 100c is formed by the groove portion in the axis line direction arranged on the inner circumferential surface of the oil pump cover 100 and the outer circumferential surface of the stator sleeve 101. Thus, the lubricating oil of the third engagement oil path 100b (i.e., hydraulic pressure for clutch engagement) is supplied through the oil path 100c to the oil chamber 76 at the time of clutch engagement. Therefore, at the time of clutch engagement, the oil path switching member 81 moves toward the gear shift unit side, and interrupts the pinion oil path 24e and opens the clutch oil path 24d with the oil path 81b. At the time of clutch engagement, the hydraulic pressure of the oil chamber 76 is also similarly held since the clutch engagement pressure of the engagement oil chamber 33 is maintained to hold the engagement state, whereby the position in the axis line direction of the oil path switching member 81 can be continuously held at the position illustrated in FIG. 4.

Figure 6:
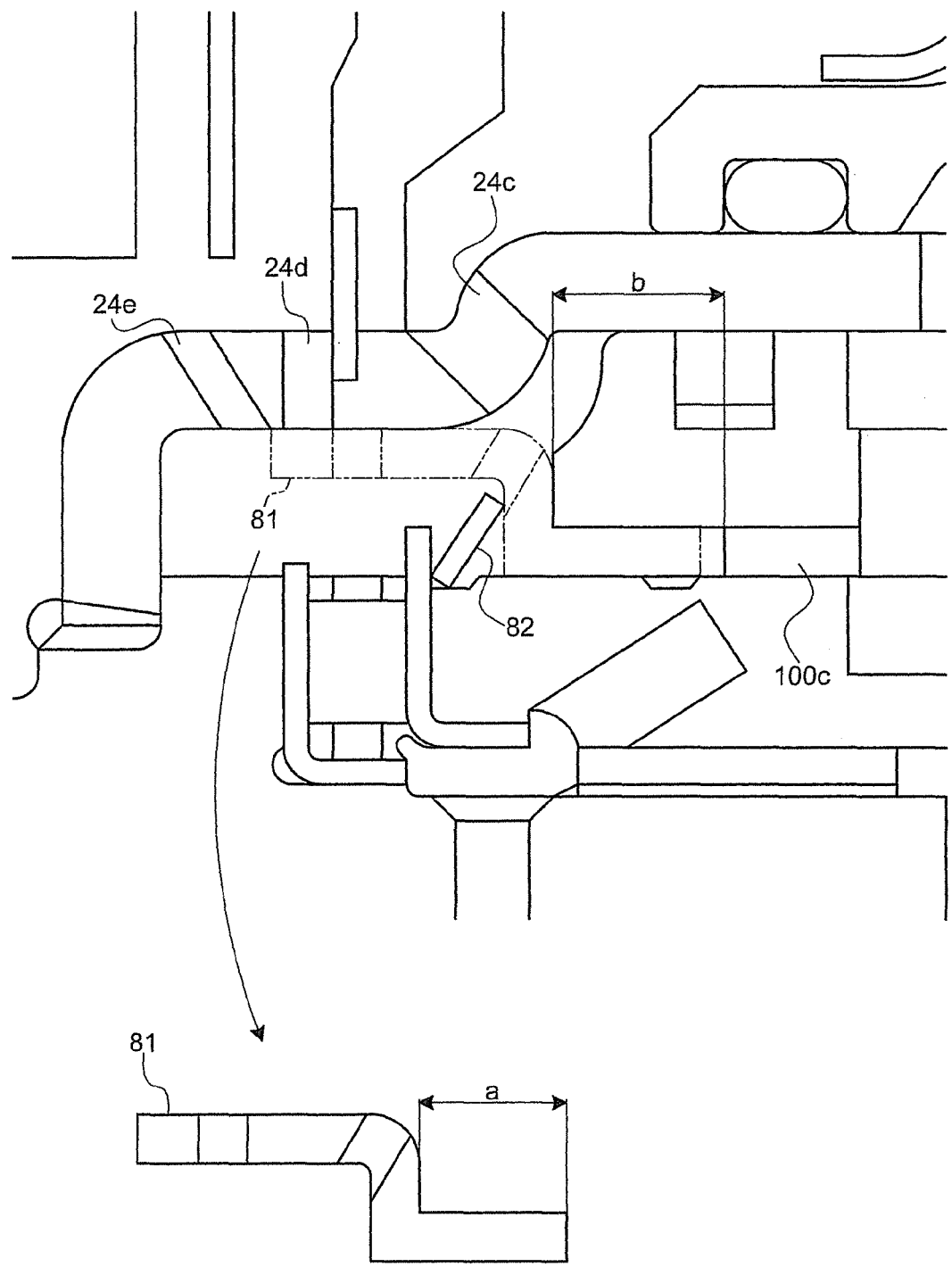
FIG. 6 is an explanatory view when specifying a shape of the oil path switching member.

As illustrated in FIG. 6, the oil chamber 76 is preferably arranged with the axial length a on the power source side of the oil path switching member 81 set shorter than a distance b from the opening closer to the oil path switching member 81 of the oil path 100c to the end face of the oil pump cover 100. Thus, in the lubricating device, the annular oil chamber 76 can be ensured regardless of to which position in the axis line direction the oil path switching member 81 moved with respect to the oil pump cover 100. Therefore, the lubricating device can act the hydraulic pressure on the entire annular end face of the oil path switching member 81 and easily move the oil path switching member 81 even if the lubricating oil supplied to the oil chamber 76 is a small amount, that is, even if the hydraulic pressure of the oil chamber 76 is low pressure.

At the time of clutch release, the position in the axis line direction of the oil path switching member 81 needs to be held at the position illustrated in FIG. 2 so that the pinion oil path 24e is opened and the clutch oil path 24d is interrupted. When switching from the clutch engagement state to the clutch release state, the oil path switching member 81 needs to be moved toward the power source side. Thus, in the lubricating device, an elastic member 82 is arranged in the oil chamber 71, and the oil path switching member 81 is moved to the position in the axis line direction at the time of clutch release or is held at the relevant position by the elastic force of the elastic member 82. The elastic member 82 applies the elastic force toward the power source side with respect to the oil path switching member 81 regardless of whether the forward clutch 20 is in the clutch engagement state or the clutch release state. An annular conical disc spring is used for the elastic member 82. In the exemplification, the radially inner side portion of the elastic member 82 is brought into contact with one race 61a of the thrust bearing 61 so that the elastic member 82 generates the elastic force. Thus, the race 61a in the exemplification has the radially outer side portion arranged extending toward the radially outer side, where the radially inner side portion of the elastic member 82 is locked at the annular portion of the oil chamber 71 arranged in an extending manner.

Therefore, the lubricating device of the present embodiment performs the switching of the oil path with the oil path switching member 81 to introduce the lubricating oil of the oil chamber 71 to the clutch lubricating oil chamber 73a in the oil chamber 73 at the time of clutch engagement, and introduce the lubricating oil of the oil chamber 71 to the pinion lubricating oil chamber 73b in the oil chamber 73 at the time of clutch release. Therefore, according to the lubricating device, a great amount of lubricating oil can be supplied to the forward clutch 20 than to the pinion unit at the time of clutch engagement.

At the time of clutch release, on the other hand, a great amount of lubricating oil can be supplied to the pinion unit than to the forward clutch 20. Thus, the lubricating device can preferentially supply the lubricating oil to the forward clutch 20 or the pinion unit requiring lubrication and cooling, whereby the lubricating performance and the cooling performance of the forward clutch 20 and the pinion unit can be enhanced, and the durability thereof can be enhanced.

For example, if the vehicle repeats stop and start at the time of traffic congestion, and the like, the forward clutch 20 repeats the release operation and the engagement operation in accordance therewith. In the vehicle in which inertia traveling is enabled, the forward clutch 20 is released with the stopping of the power source and the forward clutch 20 is engaged with the restart of the power source during the inertia traveling, and hence the engagement operation and the release operation of the forward clutch 20 are sometimes repeated during the inertia traveling. In such cases as well, the lubricating device of the present embodiment can preferentially supply the lubricating oil to the pinion unit at the time of clutch release of the forward clutch 20, and preferentially supply the lubricating oil to the forward clutch 20 at the time of clutch engagement of the forward clutch 20. That is, even when the forward clutch 20 repeats the release operation and the engagement operation, the lubricating device can preferentially supply a great amount of lubricating oil to the forward clutch 20 or the pinion unit that requires lubrication and cooling in accordance with the operation thereof. Therefore, according to such aspects as well, the lubricating device can enhance the lubricating performance and the cooling performance of the forward clutch 20 and the pinion unit, and can enhance the durability thereof. Therefore, the lubricating device can obtain effects that are useful even during the inertia traveling, and hence can also be applied to the supply of lubricating oil of the automatic transmission 1 mounted on the vehicle that performs inertia traveling during traveling.

Furthermore, as described above, the clutch oil path 24*d* is not formed in the clutch drum 24 in this type of automatic transmission 1 of the related art, so that the lubricating oil of the oil chamber 71 is introduced from the pinion oil path 24*e* to the oil chamber 73 toward the pinion lubricating oil chamber 73*b* side. Thus, the lubricating oil introduced to the oil chamber 73 in such manner is supplied to the conventional forward clutch 20 through the clutch lubricating oil chamber 73*a* regardless of the state of the forward clutch 20. Therefore, conventionally, the supply amount of the lubricating oil to the forward clutch 20 may possibly lack if the forward clutch 20 repeats the release operation and the engagement operation. However, the lubricating device of the present embodiment can supply a great amount of lubricating oil to the forward clutch 20 in this case as well, as described above, whereby the durability of the forward clutch 20 can be enhanced than the conventional lubricating device. Thus, the lubricating device of the present embodiment does not need to increase the capacity of the oil pump OP compared to the prior art, whereby degradation of fuel efficiency and increase in cost can be suppressed.

[Modification 1]

Figure 7:
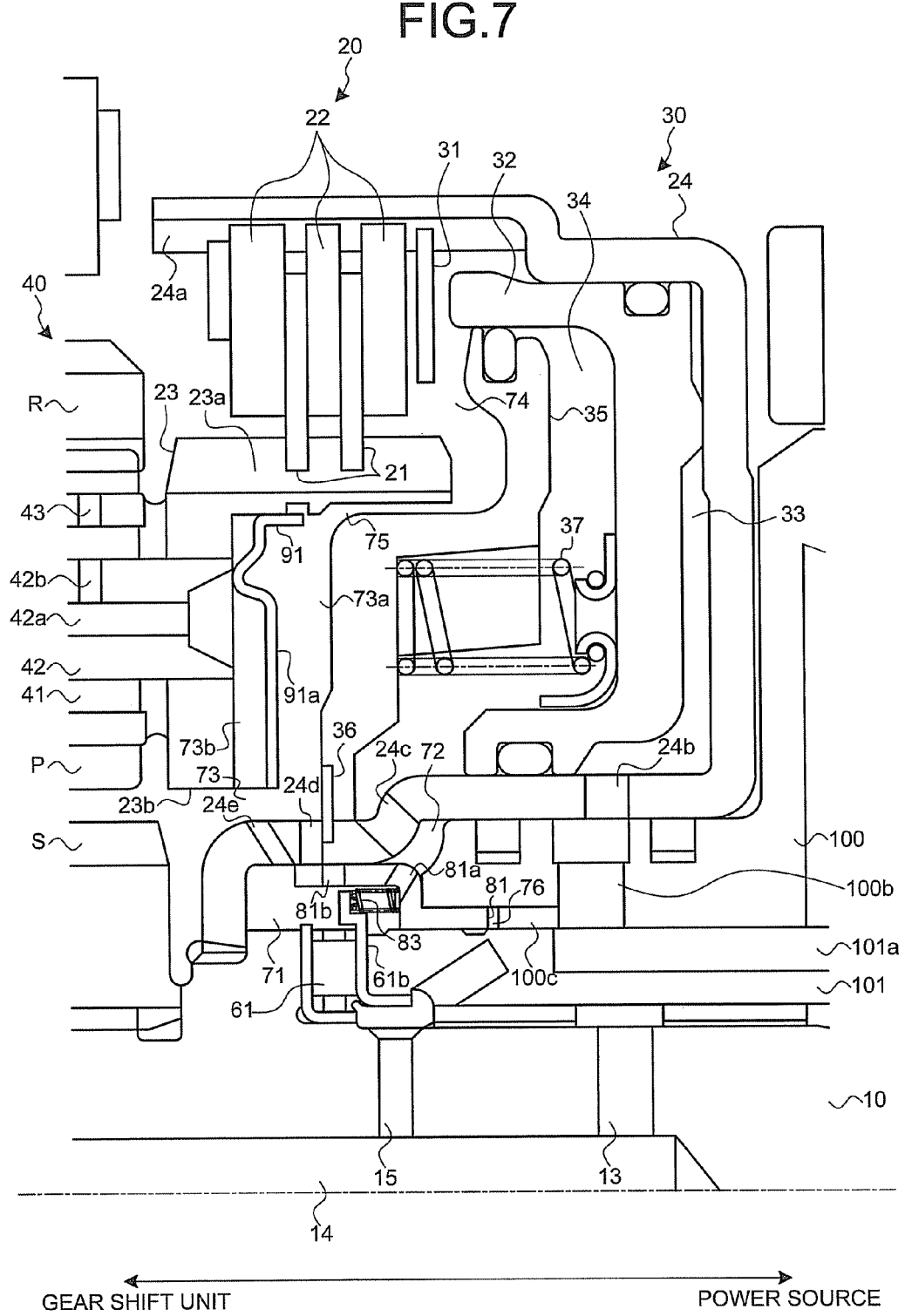
FIG. 7 is a view illustrating a state at the time of clutch release of a lubricating device according to Modification 1.

In the embodiment described above, the elastic member (conical disc spring) 82 for returning the oil path switching member 81 to the original position at the time of clutch release is supported with the race 61*a* of the thrust bearing 61. According to Modification 1, a race 61*b* of the thrust bearing 61 is further extended to the vicinity of the inner circumferential surface of the gear shift unit side of the oil path switching member 81 and the elastic member 82 is replaced with an elastic member 83, as illustrated in FIG. 7, in the lubricating device of the embodiment. The elastic member 83 applies the elastic force toward the power source side with respect to the oil path switching member 81 regardless of whether the forward clutch 20 is in the clutch engagement state or the clutch release state, similar to the elastic member 82. The elastic member 83 is arranged in plurals at substantially equal interval in the circumferential direction. The helical spring is used herein. The elastic member 83 brings one end into contact with the annular surface of the extending portion of the race 61*b* and brings the other end into contact with a boundary portion of the power source side and the gear shift unit side in the oil path switching member 81. The lubricating device can obtain effects similar to the embodiment even if configured in such manner.

The elastic member 83 preferably has one end attached to the race 61*b* in advance. Thus, the lubricating device of the present modification can reduce the number of components and can enhance the workability of when assembling the elastic member 83 and the oil path switching member 81.

[Modification 2]

Figure 8:
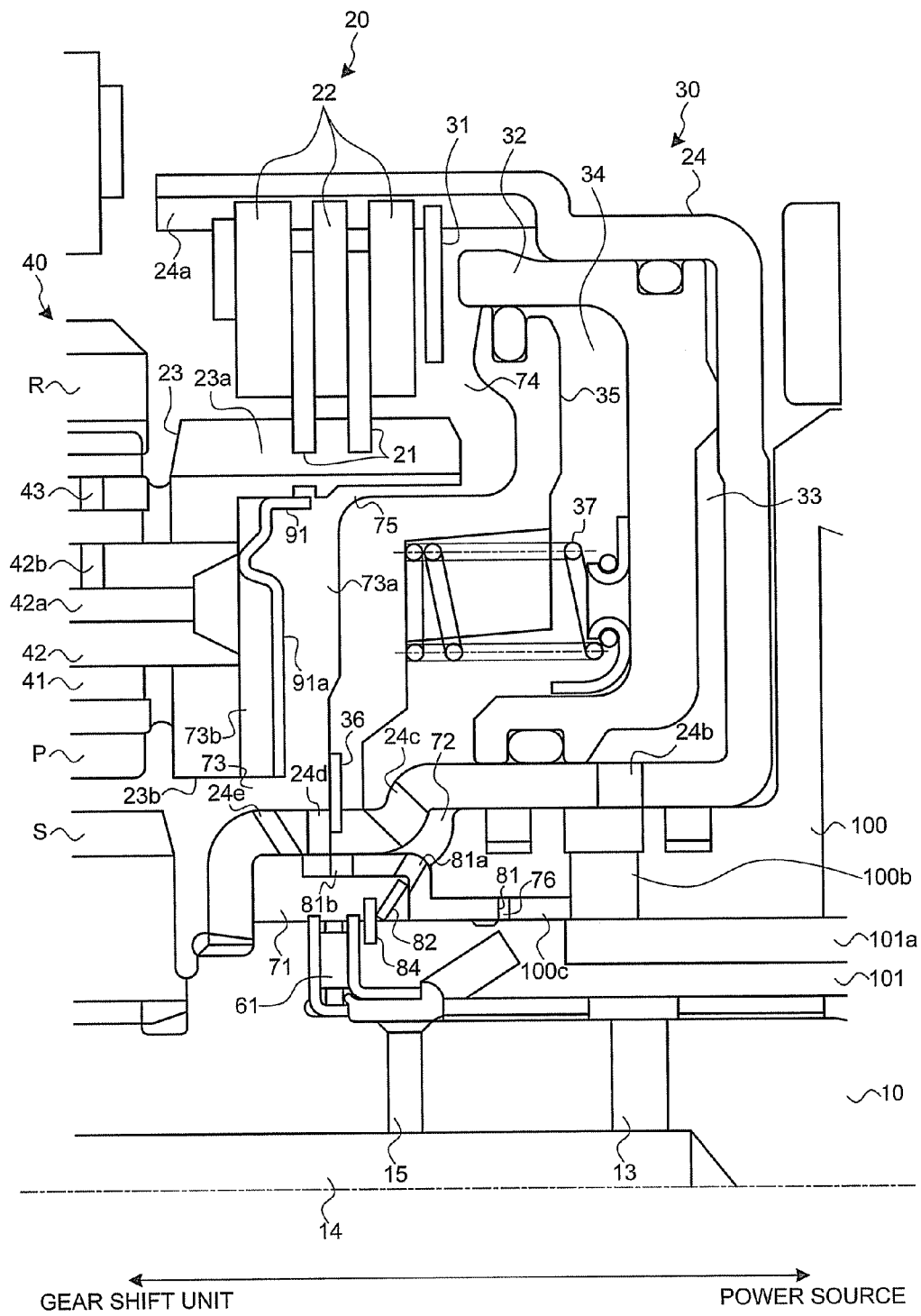
FIG. 8 is a view illustrating a state at the time of clutch release of a lubricating device according to Modification 2.

In the embodiment and Modification 1 described above, the elastic force of the elastic member 82 or the elastic member 83 is received with the thrust bearing 61, and thus the thrust force is input to the thrust bearing 61 and the bearing loss may be increased. According to Modification 2, an annular locking member 84 such as a snap ring, and the like is arranged on the outer circumferential surface of the oil pump cover 100, and the radially inner side portion of the elastic member (conical disc spring) 82 is supported with the annular surface of the locking member 84, as illustrated in FIG. 8, in the lubricating device of the embodiment (or Modification 1). The lubricating device can obtain effects similar to the embodiment even if configured in such manner. In the lubricating device of the present modification, the thrust force by the elastic member 82 is not input to the thrust bearing 61, and hence the increase in the bearing loss can be suppressed. Furthermore, in the lubricating device of the present modification, the locking member 84 can be attached to the oil pump cover 100 in advance, thus enhancing the workability of when assembling the oil path switching member 81.

REFERENCE SIGNS LIST 1 automatic transmission
10 input shaft
11 first oil path
12 second oil path
13 third oil path
14 fourth oil path
15 fifth oil path
20 forward clutch
21 first engagement unit
22 second engagement unit
23 holding member
23*a* tube portion
23*b* annular portion
24 clutch drum
24*a* holding portion
24*c* first clutch release oil path
24*d* clutch oil path
24*e* pinion oil path
32 piston
33 engagement oil chamber
34 canceller oil chamber
35 annular body
37 elastic member
40 differential device
41 bearing
42 pinion shaft
42*a*, 42*b*, 43 oil path
61 thrust bearing
61*a*, 61*b* race 71 oil chamber (first oil chamber)
72, 73, 74, 76 oil chamber
73a clutch lubricating oil chamber (second oil chamber)
73b pinion lubricating oil chamber (third oil chamber)
75 oil path
81 oil path switching member
81a second clutch release oil path
81b oil path
82, 83 elastic member
84 locking member
91 partitioning member
91a evaginating portion
100 oil pump cover
100a first engagement oil path
100b third engagement oil path
100c oil path
101 stator sleeve
101a second engagement oil path
c carrier
op oil pump
p pinion gear
r ring gear
s sun gear

The invention claimed is:

1. A lubricating device of an automatic transmission comprising:
   a first oil chamber, to which a lubricating oil is introduced;
   a partitioning member configured to partition a space, to which the lubricating oil of the first oil chamber is introduced;
   a second oil chamber partitioned by the partitioning member and to which a lubricating oil to supply to a forward clutch is introduced; and
   a third oil chamber partitioned by the partitioning member and to which a lubricating oil to supply to a pinion unit coupled with one engagement unit of the forward clutch is introduced, wherein
   a clutch oil path that introduces the lubricating oil of the first oil chamber to the second oil chamber and a pinion oil path that introduces the lubricating oil of the first oil chamber to the third oil chamber are formed in a member interposed between the first oil chamber and the space in which the partitioning member is arranged, and
   an oil path switching member that opens the clutch oil path and interrupts the pinion oil path at time of engagement of the forward clutch, and that interrupts the clutch oil path and opens the pinion oil path at time of release of the forward clutch is arranged.

2. The lubricating device of the automatic transmission according to claim 1, wherein
   the oil path switching member performs oil path switching at the time of engagement of the forward clutch by using a hydraulic pressure for clutch engagement of the forward clutch.

3. The lubricating device of the automatic transmission according to claim 2, wherein
   the automatic transmission is mounted on a vehicle coasting under no power conditions.

4. The lubricating device of the automatic transmission according to claim 1, wherein
   the automatic transmission is mounted on a vehicle coasting under no power conditions.

5. The lubricating device of the automatic transmission according to claim 1, wherein
   the second oil chamber is connected to a first oil path that introduce the lubricating oil of the second oil chamber to the forward clutch,
   the second oil chamber is arranged between the first oil chamber and the first oil path,
   the third oil chamber is connected to a second oil path that introduce the lubricating oil of the third oil chamber to the pinion unit, and
   the third oil chamber is arranged between the first oil chamber and the first oil path.

* * * * *